(12) United States Patent
Wurmfeld

(10) Patent No.: US 9,902,108 B1
(45) Date of Patent: Feb. 27, 2018

(54) RAPID PROTOTYPING METHOD OF PRODUCING TOOLING FOR AN INJECTION MOLD

(71) Applicant: Capital One Services, LLC, McLean, VA (US)

(72) Inventor: David K. Wurmfeld, Fairfax, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/692,369

(22) Filed: Aug. 31, 2017

(51) Int. Cl.

| | |
|---|---|
| *B29C 45/26* | (2006.01) |
| *B29C 64/165* | (2017.01) |
| *B33Y 10/00* | (2015.01) |
| *B29C 41/36* | (2006.01) |
| *D01F 1/10* | (2006.01) |
| *B22C 9/06* | (2006.01) |
| *B33Y 70/00* | (2015.01) |

(52) U.S. Cl.
CPC ............ *B29C 64/165* (2017.08); *B29C 41/36* (2013.01); *B33Y 10/00* (2014.12); *B22C 9/068* (2013.01); *B29C 45/2673* (2013.01); *B33Y 70/00* (2014.12); *D01F 1/10* (2013.01)

(58) Field of Classification Search
CPC ... B29C 64/165; B29C 41/36; B29C 45/2632; B29C 33/3828; B29C 33/3807; B29C 45/2673
See application file for complete search history.

(56) References Cited

U.S. PATENT DOCUMENTS

| | | | | |
|---|---|---|---|---|
| 5,156,754 A | * | 10/1992 | Nomura | B29C 33/3807 249/134 |
| 5,976,457 A | * | 11/1999 | Amaya | B22C 1/00 419/36 |
| 2001/0050155 A1 | * | 12/2001 | Billiet | B22C 7/005 164/6 |

* cited by examiner

*Primary Examiner* — Jill L Heitbrink
(74) *Attorney, Agent, or Firm* — Finnegan, Henderson, Farabow, Garrett & Dunner LLP

(57) ABSTRACT

A method of producing an injection molding tool for molding an article includes producing a replica of the article using at least one of an additive manufacturing process, a solid freeform fabrication process, or a computer numerically controlled (CNC) process. A support block is configured to receive at least a portion of the replica of the article and support the replica with at least one of an outer peripheral surface of the replica or an inner peripheral surface of the replica positioned at a spaced distance from a peripheral surface of the support block. The replica is supported inside the support block at the spaced distance, a ceramic resin material is introduced into the spaced distance and cured to form a ceramic shell insert, the insert is removed from the cavity and sintered, and the insert is positioned within the support block to form a part of a mold tool adapted for installation in a standard plastic injection molding machine.

24 Claims, 2 Drawing Sheets

RAPID PROTOTYPING METHOD OF PRODUCING TOOLING FOR AN INJECTION MOLD

TECHNICAL FIELD

The disclosed embodiments generally relate to tooling for an injection mold and, more particularly, a rapid prototyping method of producing tooling for an injection mold.

BACKGROUND

Various molding processes exist to form a variety of molded articles. For example, injection molding, blow molding, compression molding, vacuum molding, and the like, have been used in many industries for fabrication of various molded articles. The molds and molded articles can be formed from a number of materials and in a variety of configurations. Historically, a mold has been a costly piece of manufacturing equipment and has typically been suited to fabricate a single design of the molded article. In such an arrangement, any change to the design of the molded article generally would require the creation of a new mold. This arrangement then required a costly retooling anytime a change was made to the molded article design.

In addition, any change to the molded article design, or to the mold itself, would often require considerable time because the entire mold would need to be rebuilt. Further still, a given mold can only be used for the specific design of the molded article for which it was built. This would require multiple complete molds to fabricate multiple parts or multiple designs (e.g., parts of different sizes, different styles, etc., all typically require a new and different mold). These conventional mold arrangements are costly and generally limit the variations available within a production run of a given molded article.

In some applications, a method for producing multiple, dimensionally accurate, and functional prototypes of an article involves the use of polymeric molds in an injection molding system. Although the primary focus of the following description relates to tooling for injection molding, those skilled in the art will recognize that other molding systems, such as blow molding, would be suitable for producing prototypes. Injection molding is an intermittent, cyclic process in which particles of polymeric material are heated until molten. The molten material is then forced into a closed mold in which it solidifies to form a desired article. The manner in which the molten material solidifies depends on the type of injected material. Thermoplastic materials harden upon cooling while thermosetting materials solidify by the addition of heat. Injection molding systems typically include mixing and melting sections, a means for injecting the molten mass, and a molding section.

Molds within injection molding systems contain a cavity, or female section, which represents a reverse image of an outer peripheral surface of a desired article, and a core, or male section, which represents the inner details of the article. The cavity and core sections of an injection mold are supported in mold fixtures, or shoes, that are in turn supported on a top part sometimes referred to as the cope, and a bottom part sometimes referred to as the drag. The cope and the drag are clamped together under pressure. One or more openings, or "sprues," are provided in portions of the mold sections to introduce the molten mass of polymeric material into the cavities of the mold. A mold design must also provide venting to allow for the escape of air and other gases as the molten material is introduced into the mold.

The material of choice for mold construction must be capable of withstanding the injection molding operation. Sufficient temperature and pressure must be developed within the tool to ensure the molded product will reflect the resin manufacturer's performance specifications. An approximate plastic pressure applied to the resin during injection and packing will vary from about 1200 psi to about 20,000 psi.

The molds used in an injection molding process may be designed using a computer-aided design software package that analyzes the configuration of the desired article. The software program thereafter calculates a reverse image of the desired article and allows the incorporation of desired venting, cooling, and ejection channels. Prototypes are molded from a number of different polymeric materials. The selected molding material corresponds to the type of material to be used on the final article. As a result of using the same type of molding material, the user can produce a functional prototype. A functional prototype means that the resulting prototype has substantially the same properties, such as weight, density, feel, and flexibility, as the desired final article. A functional prototype can be subjected to a battery of performance tests as well as being visually inspected for accuracy. The ability to subject the resulting prototypes to destructive testing is a significant advantage over systems that produce only one prototype per production cycle. Examples of commonly used polymeric materials include polyolefins such as polypropylene, styrenics such as acrylonitrile-butadiene-styrene copolymer (ABS), polycarbonate, acetal etc.

Unfortunately, injection molding is extremely hard on molds due to the abrasiveness of the injected materials, the temperatures, and the pressures, so a mold or mold insert produced from the plastic materials typically used in an additive manufacturing process is not able to withstand the conditions of typical injection molding of plastics for large numbers of articles produced.

The present disclosure is directed to addressing one or more of the problems set forth above and/or other problems associated with rapid prototyping of tooling for an injection molding operation.

SUMMARY

In one aspect, the present disclosure is directed to a method of producing a mold for injection molding an article. The method includes producing a replica of the article using at least one of an additive manufacturing process, or a subtractive manufacturing process. The method also includes providing a support block configured to receive at least a portion of the replica of the article and support the replica with at least one of an outer peripheral surface of the replica or an inner peripheral surface of the replica positioned at a spaced distance from a peripheral surface of a portion of the support block. The replica is supported inside the support block at the spaced distance, and a ceramic resin material is introduced into the spaced distance. The ceramic resin material is allowed to cure and form a ceramic mold insert supported in the support block. The method still further includes removing the replica from the ceramic mold insert, removing the ceramic mold insert from the support block, subjecting the mold insert to a sintering process, and replacing the ceramic mold insert within the support block to form a part of a mold tool adapted for installation in a standard plastic injection molding machine.

In another aspect, the present disclosure is directed to a method of manufacturing an article that includes forming a support block comprising a cavity defined therein, the cavity comprising a peripheral surface generally corresponding in configuration to at least one of an inner peripheral surface of the article or an outer peripheral surface of the article. A replica of the article is positioned at least partially within the cavity such that a space is created between at least one of an outer peripheral surface of the replica or an inner peripheral surface of the replica, and a peripheral surface of the cavity. The method includes injecting a resin impregnated with ceramic material into the space such that the resin substantially covers the at least one of an outer peripheral surface of the replica or an inner peripheral surface of the replica. The resin is allowed to solidify in the space such that a rigid mold insert is formed, the rigid mold insert forming an impression of the at least one of an outer peripheral surface or an inner peripheral surface of the replica. The replica is then removed from the mold insert, and the support block with the mold insert is installed in an injection molding fixture. The method further includes injecting a material from which the article is to be formed into the injection molding fixture and into contact with the mold insert.

In yet another aspect, the present disclosure is directed to an injection molding tool for use in producing an article. The tool includes a metal support block including a cavity formed therein in a configuration corresponding to scaled dimensions of at least one of an outer peripheral surface and an inner peripheral surface of the article. A cast shell insert is supported within the cavity, the cast shell insert having a peripheral surface positioned at a spaced distance from a peripheral surface of the cavity formed in the support block, the peripheral surface of the cast shell insert having a surface geometry corresponding to a surface geometry of the at least one of an outer peripheral surface and an inner peripheral surface of the article. The cast shell insert comprises a cured and sintered ceramic resin material.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
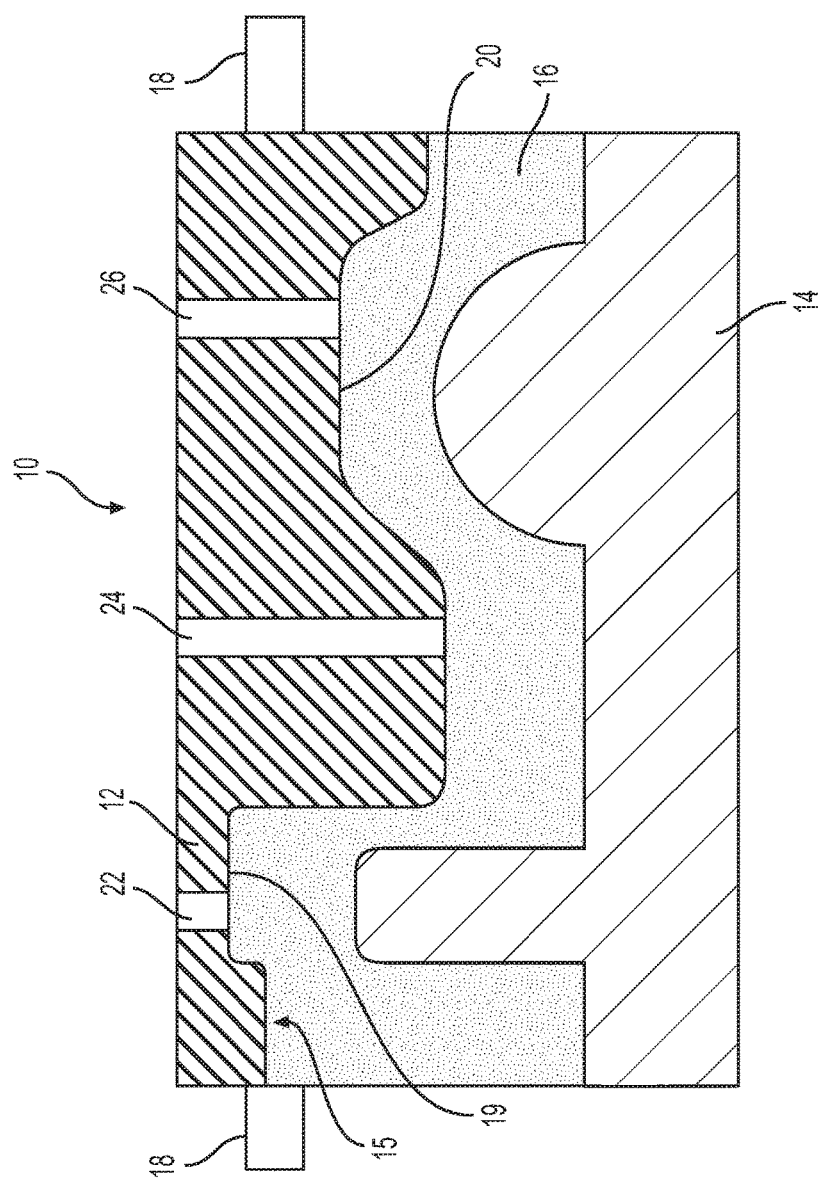
FIG. 1 is a schematic illustration of exemplary injection molding tooling according to an embodiment of this disclosure.

Complex-shaped plastic articles are typically formed by either injection molding or compression molding techniques. In some applications, the tooling for a mold (also referred to as the die) utilized in the molding operation is produced from a metal such as steel. The utilization of a tool made from steel is generally appropriate when the tooling will be used to produce in excess of 50,000 components from the tool. Because of the high cost of producing a tool made from steel, and the long lead time involved in acquiring such a tool, a steel tool is generally only selected when large numbers of components will be produced from the tool as the cost can be more easily amortized over a large number of components. However, when the desired quantities of a plastic article or component only range from hundreds to tens of thousands, the cost of producing a machined steel tool can often be prohibitive.

Since aluminum can be machined more readily than steel, aluminum has been a somewhat less expensive alternative to steel. However, aluminum tooling by itself may not be suitable for injection molding large quantities of plastic articles due to its poor abrasion resistance. In addition to the expense associated with steel and aluminum tooling, it may be desirable to have the capability to rapidly prototype plastic components by utilizing techniques that are as close as possible to those techniques that will be used in the actual production process. For example, in the financial services industry, a manufacturer of transaction cards, electrical chargers used in recharging chargeable transaction cards, or other components associated with the use of financial transaction cards may wish to test various alternative designs for the cards, chargers, or other associated components. The goal of these tests may be to closely mimic the form, fit, and function of the production transaction cards, card chargers, or other associated components, while at the same time enable rapid and frequent changes to the designs of the components. For this use, steel or aluminum tooling could be too expensive, and the time taken to redesign and produce modified tooling each time a new design is developed could be prohibitive.

Cast mold inserts may provide a solution for short run, rapidly fabricated tooling. Cast mold inserts may be formed of castable materials such as epoxy, silicone or urethane resins, with or without ceramic or metal fillers. In the process of fabricating the cast mold inserts, a pattern or replica of the article to be produced in an injection molding operation may be made from a suitable material, such as plastic, wood, steel, and/or aluminum. Any of various additive or subtractive manufacturing processes, including, for example, 3D printing, may be used in producing the pattern or replica. The pattern may replicate the internal and/or external dimensional features of the article to be produced. The pattern may be placed in a cavity formed in a mold support block. The pattern may be supported in the support block at a spaced distance from a peripheral surface of a cavity in the support block in order to form an enclosed volume. A castable material such as epoxy may be poured or injected into the enclosed volume around the pattern. The epoxy may be allowed to cure, after which the mold may be opened, and the pattern removed. The cast mold insert, now in the form of a shell that was formed in the enclosed volume between the pattern and the support block, may be removed from the support block for further processing such as sintering.

The resultant mold insert formed during the process according to various implementations of this disclosure may then be installed in a standardized mold support block, which may comprise a mold cavity support block or a mold core support block having one or more cavities with peripheral surfaces that include dimensions corresponding to the article to be produced, but without all of the detailed dimensions and features of the article. A "standardized" mold support block may be a support block that is "off-the-shelf", and that does not have to be particular to the specific part to be molded. Alternatively, the support block may be tailored to the specific part to be molded, at least to some degree, such that the enclosed volume between the pattern and the support block is reduced, and the amount of castable material introduced into the closed volume around the pattern may be reduced. Having been cast against the peripheral surfaces of the pattern replicating the article to be produced, the cast mold insert will also replicate the desired dimensions of the article. The dimensions of the pattern, and therefore the dimensions of the cast mold insert, may be scaled appropriately from the dimensions of the final article to allow for changes in dimension of the cast mold insert during curing and other processing, and for changes in dimension of the material used to form the final article during the final production process.

The standardized mold cavity support block or mold core support block may be machined from an aluminum material or other material with sufficient structural strength and stiffness characteristics to provide the necessary support for the cast mold insert during a production injection molding process. When supported in the mold support block, the mold insert can withstand the pressures and temperatures of the production process while at the same time providing an accurate replication of the detailed dimensional features of the article. The resultant tooling comprising mold cavity and mold core support blocks with cast shells inserted therein may be suitable for withstanding the abrasive characteristics of a large variety of different injection molded plastic materials, and the temperatures and pressures experienced during the production of a large number of plastic parts in a standard injection molding machine.

The standardized mold support blocks used in conjunction with the cast mold inserts according to various embodiments of this disclosure may be significantly less expensive than traditional steel tooling since the mold support blocks do not have to be machined to the precise dimensions of the desired article. Standardized mold support blocks suitable for supporting a variety of different cast mold inserts with different detailed dimensions can be produced in advance, with no particular knowledge of the final mold shape. Each time a new design or variation to an old design for an article is implemented, rapid prototyping techniques may be used to produce a new replica of the article. The new replica may be used in conjunction with the same standardized mold support blocks to produce new cast mold inserts in a small fraction of the time that would be necessary to produce entirely new mold support blocks having the precise dimensions of the desired article machined into one or more cavities or protrusions of the support blocks.

The cast mold inserts supported within the standardized mold support blocks have sufficient strength and stiffness to avoid distortion during the typical medium to high temperature and pressure plastic injection molding and compression molding applications. A close fit between the cast mold insert and the mold support block in which it was formed in conjunction with a pattern produced using rapid prototyping techniques ensures that the stresses exerted on the cast mold insert during an injection molding operation are transferred directly to the mold support block. The cast mold inserts may also be provided with fillers and additives to achieve a desired thermal conductivity for enabling the heat transfer required for proper solidification of the plastics during an injection molding operation.

The thermal conductivity of polymer-based cast tools, such as epoxy castings, may be improved by the inclusion of additives such as aluminum or silicon carbide powder or fillers in the castable material. These types of additives may be dispersed within the castable material in a discontinuous manner. These fillers (e.g., aluminum) also provide a mechanism to channel the heat produced and given off (exothermically) during resin curing and impart additional abrasion resistance to the cast tool (e.g., silicon carbide). The use of a polymer-based cast tool insert according to various embodiments of this disclosure provides the ability to prototype parts using a "near production" process so that all aspects of both the prototype part and the production thereof can be analyzed and observed. This includes the ability to affect heat transfer rates during molding that mimic the heat transfer rates of production steel tooling.

A method of producing a mold for injection molding an article according to an exemplary implementation of this disclosure may include producing a replica of the article using a rapid prototyping method of manufacturing. The rapid prototyping method of manufacturing the replica may include one or more of additive manufacturing processes, solid freeform fabrication processes, and computer numerically controlled (CNC) processes. A number of different additive manufacturing processes have been developed that can be used in accordance with various implementations of this disclosure to rapidly produce a prototype or model of a desired article from the three-dimensional (3D) data characterizing the design of the article.

An additive manufacturing technology known as Fused Deposition Modeling™ (FDM)™ is a solid-based rapid prototyping process that extrudes build materials of plastic, such as Acrylonitrile Butadiene Styrene (ABS), layer by layer, to build a 3D model. The build material is added to the FDM™ machine in a filament form contained in a cartridge. The FDM™ machine feeds the material from the cartridge up to a head that heats and melts the material. The head traverses in an X and Y direction and extrudes build material onto a platform to create a two-dimensional cross section of the model. The material quickly solidifies, and the build platform drops to allow the next layer to be extruded upon the first. This process continues until the 3D model is complete. FDM™ and other additive manufacturing techniques allow the operator to create high strength prototypes that are functional hands-on prototypes, and that can withstand rigorous testing and won't warp, shrink, or absorb moisture.

A standard mold base, or master mold for use in a typical plastic injection molding machine, is made up of at least two parts, usually termed the cavity and core side. According to various exemplary embodiments of this disclosure, each of the cavity and core side of the mold may comprise a mold support block portion in which suitable protrusions, pockets, or mounting cavities are milled or otherwise formed to receive a cast mold cavity insert or cast mold core insert that replicates scaled dimensions of the article to be produced. When the mold cavity support block and mold core support block with cast mold inserts are joined together, the enclosed volume between the mold cavity insert supported within the mold cavity support block and the mold core insert supported within the mold core support block defines the geometry of the inner and outer peripheral surfaces of the article to be produced. The mold parts are also configured with parting surfaces at which the mold parts come together and mate to seal off an enclosed volume corresponding to the desired injection molded article before introduction of a plastic compound into the enclosed volume formed between the cavity and the core. Additional features may also be included on the mold parts, such as registration features for assisting in the proper alignment of the cavity and core portions, sprues through which the compound is introduced into the enclosed volume, and vents that allow for the escape of gases during the introduction of the compound into the enclosed volume.

In various exemplary embodiments of the present disclosure, a prototype mold for at least one of a mold cavity insert and a mold core insert can be produced by various soft tooling techniques. Such techniques may include the machining of soft metals such as aluminum or copper alloys. Wherever tolerance specifications permit, techniques such as FDM™, or stereolithography, where a computer-guided laser beam converts a photosensitive polymer composition into a solid three dimensional part, may also be used. Although such soft tooling is not normally suitable for forming an injection molding mold, as the additive materials typically cannot withstand the heat and/or pressure associated with injection molding, and furthermore, would likely not be suitable for volume production because such materials typically wear away easily, it may be suitable for the purpose of producing a limited number of mold inserts sufficient to equip active injection molding tools.

The material for the mold inserts in various embodiments of this disclosure may be a moldable ceramic resin, which may contain ceramic materials such as silicon carbide, silicon nitride, aluminum oxide or alumina, zircon, or other highly abrasion-resistant materials. In some exemplary implementations, the dimensions of the cavities in the mold support blocks required to form the ceramic mold inserts are scaled up from the dimensions of the final configuration by approximately 20 percent, i.e., the final desired dimensions for an article are multiplied by approximately 1.2 to determine the mold cavity dimensions.

The moldable ceramic resin may require curing and exposure to elevated temperatures and pressures during a sintering process after having been introduced into the mold or die to produce a hardened ceramic shell insert with the correct dimensions for production injection molding of the final article. Accounting for shrinkage upon sintering of the ceramic resin is one area that may benefit from customizing a mold support block to minimize the amount of ceramic resin used in forming the mold inserts, i.e., smaller amounts of polymer result in smaller shrinkage amounts. Shrinkage upon sintering however is quite isotropic, so that all dimensions shrink substantially to the same scale factor. The isotropic nature of the shrinkage ensures that angles are maintained substantially constant in the "green" (that is, unfired) and fired articles. The exact scaling factors involved are dependent upon the specific formulations and processing techniques utilized.

FIG. 1 illustrates an exemplary implementation of a mold tool 10 according to this disclosure. The mold tool 10 includes a mold support block 12, which may be fabricated from aluminum or other materials to have a cavity 15. The mold support block 12 may be a mold cavity support block or a mold core support block. A peripheral surface of the cavity 15 is configured to correspond to a peripheral surface (outer or inner peripheral surface) of a replica of the article to be produced. The cavity 15 may include most of the features of the outer or inner peripheral surface of the replica, but without the surface finishes and details that will be included on the finished article.

The mold support block 12 may include additional desired design features, such as one or more sprues 22 for introduction of a moldable ceramic resin into a space defined between the peripheral surface of the cavity 15 and an outer or inner peripheral surface of a replica 14 of an article to be produced. The mold support block 12 may also include one or more vents 24, 26 configured to allow gases to exit from the space between the replica 14 and the support block 12 during the casting of a ceramic mold insert 16. Additional passages 18 may also be provided for heating or cooling of the support block during a molding operation.

In the case of a mold cavity support block, the mold insert 16 may encompass the recessed surfaces or cavities formed in the support block. In the case of a mold core support block, the mold insert 16 may also encompass projecting surfaces of the support block. A mold core support block may include one or more projections or bosses configured with outer peripheral surfaces having dimensions that correspond to the dimensions of an inner peripheral surface of the replica of an article to be produced. A moldable ceramic resin may be introduced into a space between an inner peripheral surface of the cavity 15 in the mold cavity support block 12 and an outer peripheral surface of the replica 14. Similarly, a moldable ceramic resin may be introduced into a space between an inner peripheral surface of the replica 14 and an outer peripheral surface of a portion of a mold core support block.

Following molding of the exemplary green ceramic mold insert 16 shown in FIG. 1, any desired secondary operations can be performed on the ceramic mold insert. For instance, vents and gates can be machined into the green ceramic mold inserts if such design features are required and have not already been incorporated during the molding operation. Upon the performance of any such secondary operations, any thermoplastic binder in the moldable ceramic resin may be extracted from the green ceramic mold inserts 16 during a sintering operation. The sintered ceramic mold insert will generally constitute a faithful miniature of the green counterpart.

The sintered ceramic mold insert 16 is now ready to be mounted into the machined mounting cavity 15 of the mold support block 120. The outer peripheral surface geometry of the sintered ceramic mold insert 16 may comprise an appropriately designed mounting surface having a standardized geometry (such as the rectangular and semicircular recesses 19 and 20 of FIG. 1) so as to allow the insert 16 to fit into the mounting cavity 15 of any standardized master mold or die in such a way that the insert will be adequately supported and subjected to compressive stress during production molding of the final product. The exact configuration of the mounting surface of the green mold inserts will depend on the particular type of the desired commercial product.

In some exemplary embodiments, different mold tools 10, each equipped with a ceramic mold insert 16 may be assembled to form a multi-cavity molding die. There are many ways known in the art for securing the ceramic mold inserts 16 so that they will be maintained in a state of compressive stress throughout the molding cycle. One way of securing ceramic inserts in the machined pockets of the mold support block 12 (mold cavity support block or mold core support block) is by mechanical wedging. Another method is by providing a set of mounting pins and holes in the mounting surface of the ceramic mold insert 16 with corresponding holes and pins in the inner peripheral surface of the cavity 15 of the mold support block 12. The interfacing attachment features may be optionally fitted with spring-loaded fixtures so that the ceramic mold insert 16 can be readily snapped in the correct place within the mold cavity 15. Yet another method of securing the ceramic mold insert 16 to the cavity 15 of the mold support block 12 is through the application of a vacuum. Still another method of securing the ceramic mold insert 16 to the cavity 15 of the mold support block 12 is by providing an intermediate mounting plate or frame made from a metallic alloy with a substantially identical or slightly lower coefficient of thermal expansion as that of the ceramic mold insert 16. In such an embodiment, at the typical molding temperatures of plastics, the ceramic mold insert 16 produced in accordance with various exemplary embodiments of this disclosure will be under compressive stress.

One of the advantages of the exemplary embodiments of this disclosure resides in the ability to produce ceramic mold inserts to tight dimensional tolerances and with superior surface finish, thereby precluding the need for secondary machining or grinding. This may be achieved by controlling various process variables in the production of the moldable ceramic resin to be used in the ceramic mold inserts. The process variables may include the granulometry, or size distribution of particulate material in the ceramic resin material, and morphology of the particulate material used in the molding formulation. For example, extremely fine aluminum oxide grains of a submicron-sized alumina powder that may be used in the moldable ceramic resin may yield better surface finish and definition than would be possible when using a coarser particulate material. Another process variable that may be controlled in the production of the moldable ceramic resin material used in the formation of the ceramic mold inserts is the volumetric ratio of particulate material to binder in the green molding material. A higher volumetric ratio of particulate material to binder may result in a smaller shrinkage and, therefore, improved control over dimensional tolerances. Hence, within the limits afforded by dependent process variables such as the rheology of the green molding material and independent variables such as the specific geometry of the ceramic mold insert, ceramic mold inserts with superior dimensional tolerance and better surface finish can be achieved.

As the ceramic mold inserts 16 fabricated according to various embodiments of this disclosure are chemically inert and resistant to abrasion by molten metals, plastics, and metal or ceramic injection molding feedstocks, they are essentially wear-proof and will retain their surface finish indefinitely, thus eliminating the need for periodic mold cavity refurbishing. The greater temperature resistance and low coefficient of thermal expansion of ceramic mold inserts produced according to various embodiments of this disclosure minimizes thermal distortion or tolerance shifting within the mold, allowing easier production of precision parts. The ceramic mold inserts can be easily and instantly fitted into any active molding tool set, even by non-technical operators as the inserts incorporate a standardized mounting surface.

The combination of net shape capability, superior dimensional accuracy, surface finish and abrasion resistance, and low manufacturing cost of ceramic mold inserts produced in accordance with various embodiments of this disclosure allows substantial savings on tooling costs. Moreover, the functionally improved molding tools will produce parts of more accurate and consistent dimensions. The rapid prototyping techniques used in forming the replica 14 also greatly expedite the process of producing modified ceramic mold inserts as required for the production and testing of different designs for an article, both from the perspective of manufacturability and based on overall performance results for articles manufactured with the different designs. The molding tool 10 combines the cost savings and other efficiencies of standardized mold dies such as mold cavity support blocks and mold core support blocks adapted for use with standard injection molding machines with the flexibility and time savings afforded by the use of ceramic mold inserts produced using rapidly prototyped replicas of articles to be mass-produced. The articles produced by the injection molding of plastics using the mold tool 10 according to various exemplary embodiments of this disclosure may provide superior surface finishes, improved dimensional accuracy, part to part consistency, and at a fraction of the time and cost that would be achievable by the prior art.

Figure 2:
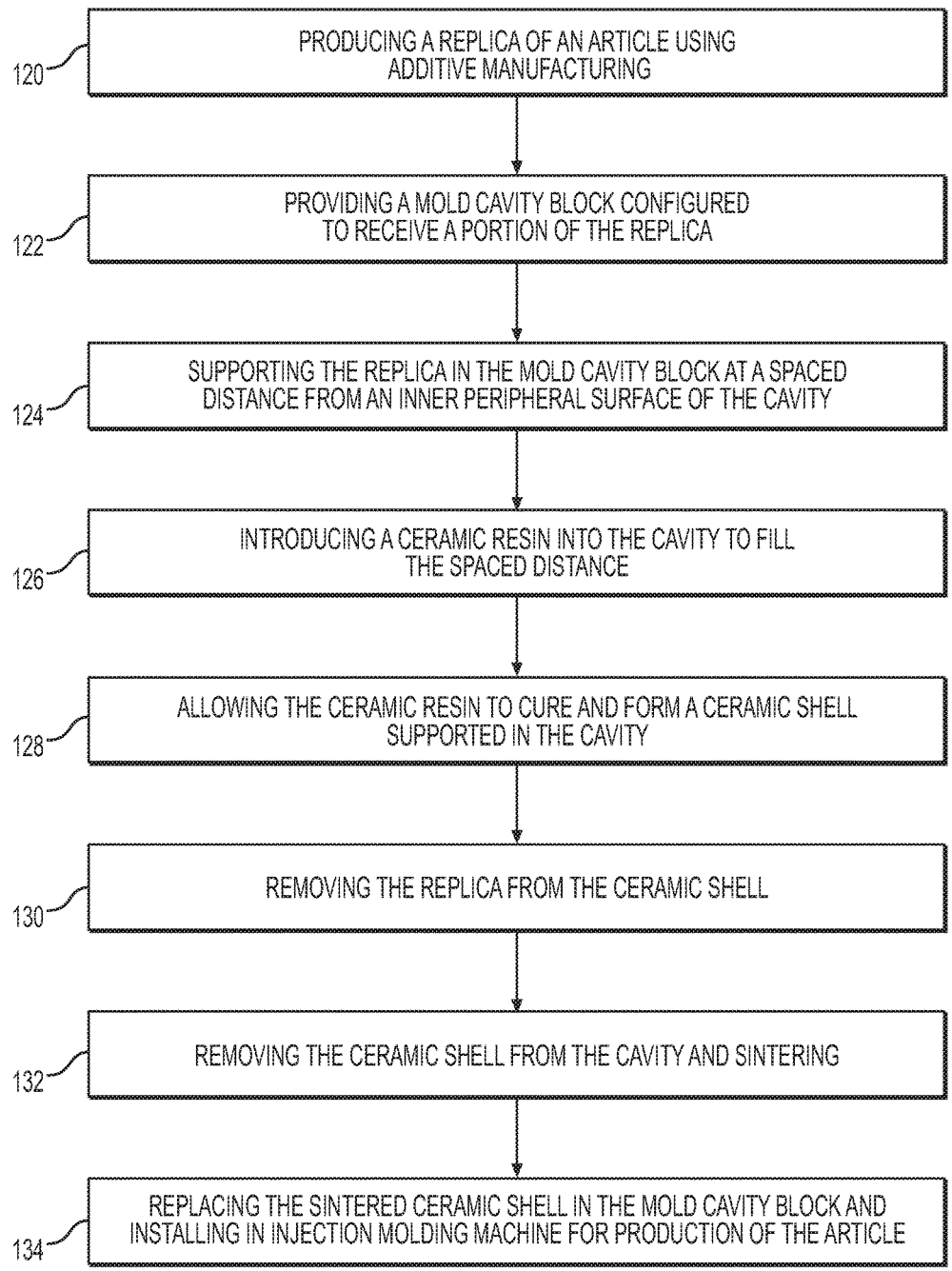
FIG. 2 is a flowchart showing an exemplary method for forming the injection molding tooling of FIG. 1, consistent with the disclosed embodiments.

FIG. 2 is a flowchart showing an exemplary method for producing injection molding tooling and using that tooling in the production of an injection molded article. The exemplary method may include, at Step 120, producing a replica of an article using additive manufacturing techniques, as discussed above. At Step 122, the exemplary method may also include providing a mold cavity support block configured to receive at least a portion of the replica of the article.

The exemplary method for producing injection molding tooling may further include, at Step 124, supporting the replica in the mold cavity support block with an outer peripheral surface of the replica positioned at a spaced distance from an inner peripheral surface of a cavity formed in the support block. At Step 126, a ceramic resin material may be introduced into the cavity to fill the spaced distance between an outer peripheral surface of the replica and the inner peripheral surface of the cavity formed in the support block. As discussed above, a replica of an article to be produced may also be supported relative to a mold core support block with an inner peripheral surface of the replica positioned at a spaced distance from an outer peripheral surface of a cavity in the mold core support block including various protrusions or other features. A ceramic resin material may be introduced into the cavity to fill the spaced distance between the inner peripheral surface of the replica and the outer peripheral surface of the cavity in the mold core support block. At Step 128, the ceramic resin material may be allowed to cure and form a ceramic shell insert supported in the cavity of the support block.

At Step 130 of the exemplary implementation of a method for producing injection molding tooling, the replica may be removed from the ceramic shell insert supported in the cavity of the support block. Subsequently, at Step 132, the ceramic shell insert may be removed from the cavity and subjected to a sintering process. Finally, at Step 134 in the disclosed exemplary implementation, the ceramic shell insert may be replaced in the mold cavity support block (or mold core support block) to form a part of a mold tool adapted for installation in a standard plastic injection molding machine and use in producing multiple copies of the article.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A method of producing a mold for injection molding an article, the method comprising:
   producing a replica of the article using at least one of an additive manufacturing process or a subtractive manufacturing process;
   providing a support block configured to:
      receive at least a portion of the replica of the article; and
      support the replica with at least one of an:
         outer peripheral surface of the replica; or
         an inner peripheral surface of the replica positioned at a spaced distance from a peripheral surface of a portion of the support block;
   supporting the replica inside the support block at the spaced distance;
   introducing a ceramic resin material into the spaced distance;

allowing the ceramic resin material to cure and form a ceramic mold insert supported in the support block;

removing the replica from the ceramic mold insert;

removing the ceramic mold insert from the support block;

subjecting the ceramic mold insert to a sintering process; and replacing the ceramic mold insert within the support block to form a part of a mold tool adapted for installation in a standard plastic injection molding machine.

2. The method of claim 1 wherein the support block comprises a mold cavity support block.

3. The method of claim 1 wherein the support block comprises a mold core support block.

4. The method of claim 1, wherein the support block is formed from a metal material comprising aluminum or steel.

5. The method of claim 1, wherein the replica is supported in the support block using at least one of a cement or a mechanical pin-and-socket structure.

6. The method of claim 1, wherein producing the replica comprises producing the replica using a Fused Deposition Method™ (FDM™) of additive manufacturing.

7. The method of claim 1, wherein producing the replica comprises producing the replica with dimensions that are scaled up from dimensions of the article so as to compensate for shrinkage of a material used in injection molding of the article.

8. The method of claim 1, wherein producing a replica of the article comprises producing a replica having:
outer dimensions that are scaled from outer dimensions of the article; and
inner dimensions that are scaled from inner dimensions of the article.

9. The method of claim 1, wherein providing a support block comprises:
providing a mold cavity support block configured to:
receive a portion of the replica; and
support the replica at a spaced distance from an inner peripheral surface of the cavity formed in the mold cavity support block; and
providing a mold core support block configured to:
mate with the mold cavity support block;
receive a portion of the replica; and
support the replica at a spaced distance from an outer peripheral surface of a portion of the mold core support block.

10. The method of claim 1, wherein the spaced distance is approximately 0.25-0.50 inch.

11. The method of claim 1, wherein the ceramic resin material comprises a urethane material impregnated with ceramic particles.

12. A method of manufacturing an article, comprising:
forming a support block comprising a cavity defined therein, the cavity comprising a peripheral surface generally corresponding in configuration to at least one of an inner peripheral surface of the article or an outer peripheral surface of the article;
positioning a replica of the article at least partially within the cavity such that a space is created between:
at least one of an outer peripheral surface of the replica or an inner peripheral surface of the replica, and
a peripheral surface of the cavity;
injecting a resin impregnated with ceramic material into the space such that the resin substantially covers the at least one of an outer peripheral surface of the replica or an inner peripheral surface of the replica;
allowing the resin to solidify in the space such that a rigid mold insert is formed, the rigid mold insert forming an impression of the at least one of an outer peripheral surface of the replica or an inner peripheral surface of the replica;
removing the replica from the mold insert;
installing the support block with the mold insert in an injection molding fixture; and
injecting a material from which the article is to be formed into the injection molding fixture and into contact with the mold insert.

13. The method of claim 12, wherein the support block comprises a mold cavity support block.

14. The method of claim 12, wherein the support block comprises a mold core support block.

15. The method of claim 12, wherein forming the support block comprises forming the support block from at least one of an aluminum material or a steel material.

16. The method of claim 12, wherein the replica is supported in the support block using at least one of a cement or a mechanical pin-and-socket structure.

17. The method of claim 12, wherein positioning the replica comprises positioning a replica produced using a Fused Deposition Method™ (FDM™) of additive manufacturing.

18. The method of claim 12, wherein positioning the replica comprises positioning a replica produced with dimensions that are scaled up from dimensions of the article in order to compensate for shrinkage of a material used in injection molding of the article.

19. The method of claim 12, wherein positioning the replica comprises positioning a replica having outer dimensions that are scaled from outer dimensions of the article, and inner dimensions that are scaled from inner dimensions of the article.

20. The method of claim 12, wherein forming a support block comprises:
forming a mold cavity support block configured to receive a portion of the replica and support the replica at a spaced distance from an inner peripheral surface of the cavity formed in the mold cavity support block; and
forming a mold core support block configured to mate with the mold cavity support block and receive a portion of the replica and support the replica at a spaced distance from an outer peripheral surface of a portion of the mold core support block.

21. The method of claim 12, wherein the space is approximately 0.25-0.50 inch.

22. The method of claim 12, wherein the ceramic resin material comprises a urethane impregnated with ceramic particles.

23. An injection molding tool for use in producing an article, the tool comprising:
a metal support block including a cavity formed therein in a configuration corresponding to scaled dimensions of at least one of an outer peripheral surface and an inner peripheral surface of the article; and
a cast shell insert supported within the cavity and having a peripheral surface positioned at a spaced distance from a peripheral surface of the cavity formed in the support block, the peripheral surface of the cast shell insert having a surface geometry corresponding to a surface geometry of the at least one of an outer peripheral surface and an inner peripheral surface of the article, the cast shell insert comprising a cured and sintered ceramic resin material.

24. The injection molding tool of claim 23, wherein:
the metal support block comprises a first mold support block configured for mounting within a pocket of a standard injection molding die;
the molding tool comprises a second mold support block configured to mate with the first mold support block along a parting surface and mount within a pocket of a standard injection molding die; and
the cast shell insert comprises a first portion supported within a first cavity of the first mold support block, and a second portion supported within a second cavity of the second mold support block.

* * * * *